United States Patent
Amimoto (10) Patent No.: US 7,894,105 B2
(45) Date of Patent: Feb. 22, 2011

(54) IMAGE READING UNIT AND IMAGE READER

(75) Inventor: Mitsuru Amimoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 1319 days.

(21) Appl. No.: 11/037,739

(22) Filed: Jan. 18, 2005

(65) Prior Publication Data

US 2006/0158696 A1    Jul. 20, 2006

(51) Int. Cl.
*H04N 1/04* (2006.01)
(52) U.S. Cl. .................. 358/474; 358/484; 358/471; 358/475; 382/275; 382/254; 399/49; 399/367
(58) Field of Classification Search .......... 358/474, 358/486, 497, 505, 506, 518, 1.2, 1.9, 475, 358/509, 512–514, 496; 250/208.1, 234–236, 250/559.39, 356–429; 382/274, 275; 399/49, 399/367
See application file for complete search history.

(56) References Cited

U.S. PATENT DOCUMENTS

| | | | | |
|---|---|---|---|---|
| 4,675,745 A * | 6/1987 | Suzuki | .................. | 358/483 |
| 5,089,901 A * | 2/1992 | Kaneko | .................. | 358/474 |
| 5,113,268 A * | 5/1992 | Yoshida et al. | .............. | 358/474 |
| 5,227,896 A * | 7/1993 | Ozawa et al. | ................ | 358/474 |
| 5,489,993 A * | 2/1996 | Ito et al. | ..................... | 358/482 |
| 6,307,648 B1 * | 10/2001 | Matsumoto | ................ | 358/474 |
| 6,502,946 B1 * | 1/2003 | Fujino et al. | ................ | 362/622 |
| 6,776,494 B2 * | 8/2004 | Fujino et al. | ................ | 362/600 |
| 6,975,949 B2 * | 12/2005 | Mestha et al. | ................ | 702/76 |
| 7,167,284 B2 * | 1/2007 | Sawada | ...................... | 358/483 |
| 7,177,056 B2 * | 2/2007 | Matsumoto | ................ | 358/474 |
| 7,391,543 B2 * | 6/2008 | Ohara | ........................ | 358/483 |
| 7,423,280 B2 * | 9/2008 | Pearson et al. | ......... | 250/559.39 |
| 7,450,277 B2 * | 11/2008 | Poletto | ....................... | 358/498 |
| 7,463,392 B2 * | 12/2008 | Yamamoto et al. | .......... | 358/496 |
| 7,471,428 B2 * | 12/2008 | Ohara et al. | ................. | 358/497 |
| 7,486,414 B2 * | 2/2009 | Arai | ........................... | 358/1.9 |
| 7,502,147 B2 * | 3/2009 | Suzuki et al. | ................ | 358/504 |
| 7,518,763 B2 * | 4/2009 | Shiraishi et al. | ............. | 358/475 |
| 7,589,871 B2 * | 9/2009 | Yoshimoto et al. | ......... | 358/496 |
| 2002/0080430 A1 * | 6/2002 | Pilloud | ....................... | 358/505 |
| 2002/0121590 A1 | 9/2002 | Yoshida | | |
| 2003/0025950 A1 * | 2/2003 | Tsunai | ....................... | 358/505 |

(Continued)

FOREIGN PATENT DOCUMENTS

EP    0570958    11/1993

(Continued)

*Primary Examiner*—Negussie Worku
(74) *Attorney, Agent, or Firm*—Canon USA Inc IP Div (57) ABSTRACT

An image reader includes two rows of image reading element arrays, that is, a first image reading element array and a second image reading element array, and a first rod lens array and a second rod lens array, disposed in correspondence with the first and second image reading element arrays and having different focal positions, in order to read an image on a transmission original in optimal focus with a CIS scanner using the rod lens arrays as when an image on a reflection original is read. The second image reading element array provides higher resolution, and has a shorter reading length. The focal length of the second rod lens array is greater than that of the first rod lens array.

8 Claims, 11 Drawing Sheets

U.S. PATENT DOCUMENTS

| | | | |
|---|---|---|---|
| 2004/0257600 A1* | 12/2004 | Hiromatsu | 358/1.9 |
| 2005/0088705 A1* | 4/2005 | Okamoto et al. | 358/474 |
| 2005/0219658 A1* | 10/2005 | Miyahara | 358/509 |
| 2007/0058180 A1* | 3/2007 | Inoue et al. | 358/1.5 |

FOREIGN PATENT DOCUMENTS

| | | |
|---|---|---|
| JP | 03-295354 | 12/1991 |
| JP | 05-328035 | 12/1993 |
| JP | 06-086020 | 3/1994 |
| JP | 11-008737 | 1/1999 |
| JP | 11-261763 | 9/1999 |
| JP | 2002-262032 | 9/2002 |
| JP | 2003-037713 | 2/2003 |

* cited by examiner

IMAGE READING UNIT AND IMAGE READER

BACKGROUND OF THE INVENTION

1. Field of the Invention

The present invention relates to an image reading unit comprising an image reading element array having a plurality of linearly disposed photoelectric conversion elements, and an image reader for reading a reflection original, such as printed paper, and a transmission original, such as a photographic film, by using the image reading unit.

2. Description of the Related Art

Conventionally, when a transmission original, such as a photographic film, is read by an image reader of a flat head type having an original table glass, a method in which the transmission original placed in a transmission original guide unit is set on the original table glass and is illuminated from thereabove by a surface light source unit is mainly used. In general, on the assumption that the main originals to be read are reflection originals, the image reader of this type is designed so that the location where light is most properly focused is situated 0 mm from the top surface of the original table glass, that is, on the original table glass. In general, when transmission originals are read, they are set 0.5 mm above the original table glass surface by a transmission original guide in order to, for example, prevent the production of a Newton ring or to allow dirt to be picked up when they contact the glass surface.

When a lens of a reducing optical system using a charge-coupled device (CCD) is used, this method does not give rise to any practical problems even if the depth of field is large and the distance between the original table glass and a transmission original is on the order of 0.5 mm.

In recent years, in order to achieve size reduction, a reading unit of a 1× magnification optical system using a rod lens array has made its appearance. Since the depth of field of the rod lens array is small, when the distance between the original table glass and a transmission original is on the order of 0.5 mm, the reading unit has a problem in that an image goes out of focus.

SUMMARY OF THE INVENTION

The present invention is directed to provide an image reading unit and an image reader, which effectively and properly read both an image on a reflection original and an image on a transmission original.

To this end, according to a first aspect of the present invention, there is provided an image reading unit including a first image reading element array comprising a plurality of photoelectric conversion elements which are linearly disposed, a second image reading element array comprising a plurality of photoelectric conversion elements which are linearly disposed, the second image reading element array being disposed parallel to the first image reading element array, a first lens member for focusing a first original image onto the first image reading element array, the first original image being disposed at a first focal position, and a second lens member for focusing a second original image onto the second image reading element array. The conjugation length of the second lens member is different from that of the first lens member. The second original image is disposed at a second focal position.

According to a second aspect of the present invention, there is provided an image reader comprising a movable unit for moving an image reading unit relative to at least one of the first original image and the second original image. The image reading unit includes a first image reading element array comprising a plurality of photoelectric conversion elements which are linearly disposed, a second image reading element array comprising a plurality of photoelectric conversion elements which are linearly disposed, the second image reading element array being disposed parallel to the first image reading element array, a first lens member for focusing a first original image onto the first image reading element array, the first original image being disposed at a first focal position, and a second lens member for focusing a second original image onto the second image reading element array. The conjugation length of the second lens member is different from that of the first lens member. The second original image is disposed at a second focal position.

According to a third aspect of the present invention, there is provided an image reading unit including a first image reading element array comprising a plurality of photoelectric conversion elements which are linearly disposed, a second image reading element array comprising a plurality of photoelectric conversion elements which are linearly disposed, the second image reading element array providing a higher resolution than the first image reading element array, a first lens member for focusing a first original image onto the first image reading element array, the first original image being disposed at a first focal position, and a second lens member for focusing a second original image onto the second image reading element array, the second original image being disposed at a second focal position.

According to a fourth aspect of the present invention, there is provided an image reader comprising a movable unit for moving an image reading unit. The image reading unit comprises a first image reading element array comprising a plurality of photoelectric conversion elements which are linearly disposed, a second image reading element array comprising a plurality of photoelectric conversion elements which are linearly disposed, the second image reading element array providing a higher resolution than the first image reading element array, a first lens member for focusing a first original image onto the first image reading element array, the first original image being disposed at a first focal position, and a second lens member for focusing a second original image onto the second image reading element array, the second original image being disposed at a second focal position.

According to a fifth aspect of the present invention, there is provided an image reading unit comprising a first lens member for converging light reflecting off a reflection original that reflects the light, a first image reading element array for reading an image on the reflection original on the basis of the reflected light converged by the first lens member, a second lens member for converging light transmitting through a transmission original that transmits the light, and a second image reading element array for reading an image on the transmission original on the basis of the transmitted light converged by the second lens member. The first and second image reading element arrays are disposed at different heights.

According to a sixth aspect of the present invention, there is provided an image reader including a movable unit for moving an image reading unit. The image reading unit includes a first lens member for converging light reflecting off a reflection original that reflects the light, a first image reading element array for reading an image on the reflection original on the basis of the reflected light converged by the first lens member, a second lens member for converging light transmitting through a transmission original that transmits the light, and a second image reading element array for reading an image on the transmission original on the basis of the transmitted light converged by the second lens member. The first and second image reading element arrays are disposed at different heights.

According to a seventh aspect of the present invention, there is provided an image reading unit comprising a first lens member for converging light reflecting off a reflection original that reflects the light, a first image reading element array for reading an image on the reflection original on the basis of the reflected light converged by the first lens member, a second lens member for converging light transmitting through a transmission original that transmits the light, and a second image reading element array for reading an image on the transmission original on the basis of the transmitted light converged by the second lens member. The unit also includes first and second members. The first image reading element array is disposed on the first member, and the second image reading element array is disposed on the second member.

According to an eighth aspect of the present invention, there is provided an image reader comprising a movable unit for moving an image reading unit. The image reading unit comprises a first lens member for converging light reflecting off a reflection original that reflects the light, a first image reading element array for reading an image on the reflection original on the basis of the reflected light converged by the first lens member, a second lens member for converging light transmitting through a transmission original that transmits the light, and a second image reading element array for reading an image on the transmission original on the basis of the transmitted light converged by the second lens member. The unit also includes first and second members. The first image reading element array is disposed on the first member, and the second image reading element array is disposed on the second member.

By virtue of the above-described structures, it is possible to effectively and properly read both an image on a reflection original and an image on a transmission original.

Further features and advantages of the present invention will become apparent from the following description of the embodiments with reference to the attached drawings.

DESCRIPTION OF THE EMBODIMENTS

Hereunder, exemplary embodiments of an image reader of the present invention will be described with reference to the drawings.

First Embodiment

Figure 1:
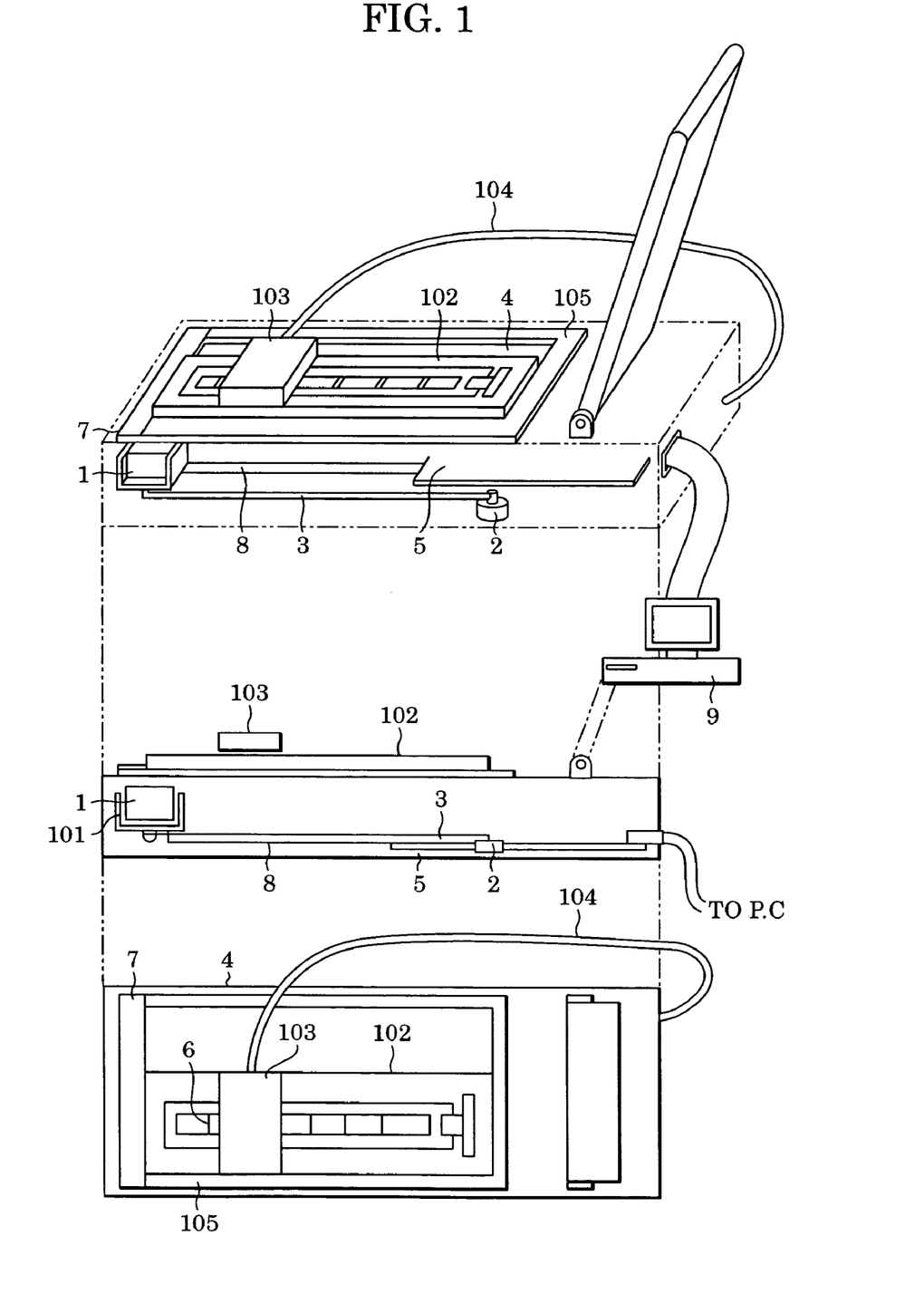
FIG. 1 is a schematic view of the basic structure of an image reader of a first embodiment of the present invention.

FIG. 1 shows an image reader of a first embodiment of the present invention. FIG. 1 shows the image reader in three views: a perspective view, a side view, and a top plan view. In FIG. 1, reference numeral 1 denotes a reading unit, reference numeral 2 denotes a stepping motor, reference numeral 3 denotes a belt, reference numeral 4 denotes an original table glass, reference numeral 5 denotes a control base, reference numeral 6 denotes a 35-mm photographic film, reference numeral 7 denotes a plate serving as a white reference plate and an original regulating plate, reference numeral 8 denotes a flat cable, reference numeral 9 denotes an external computer, reference numeral 101 denotes a holder for mounting the reading unit 1, reference numeral 102 denotes a film guide (film holder) for accommodating the 35-mm photographic film 6, reference numeral 103 denotes a film light source unit, reference numeral 104 denotes a cable for connecting the light source unit 103 and the control base 5, and reference numeral 105 denotes an original regulating plate.

Figure 2:
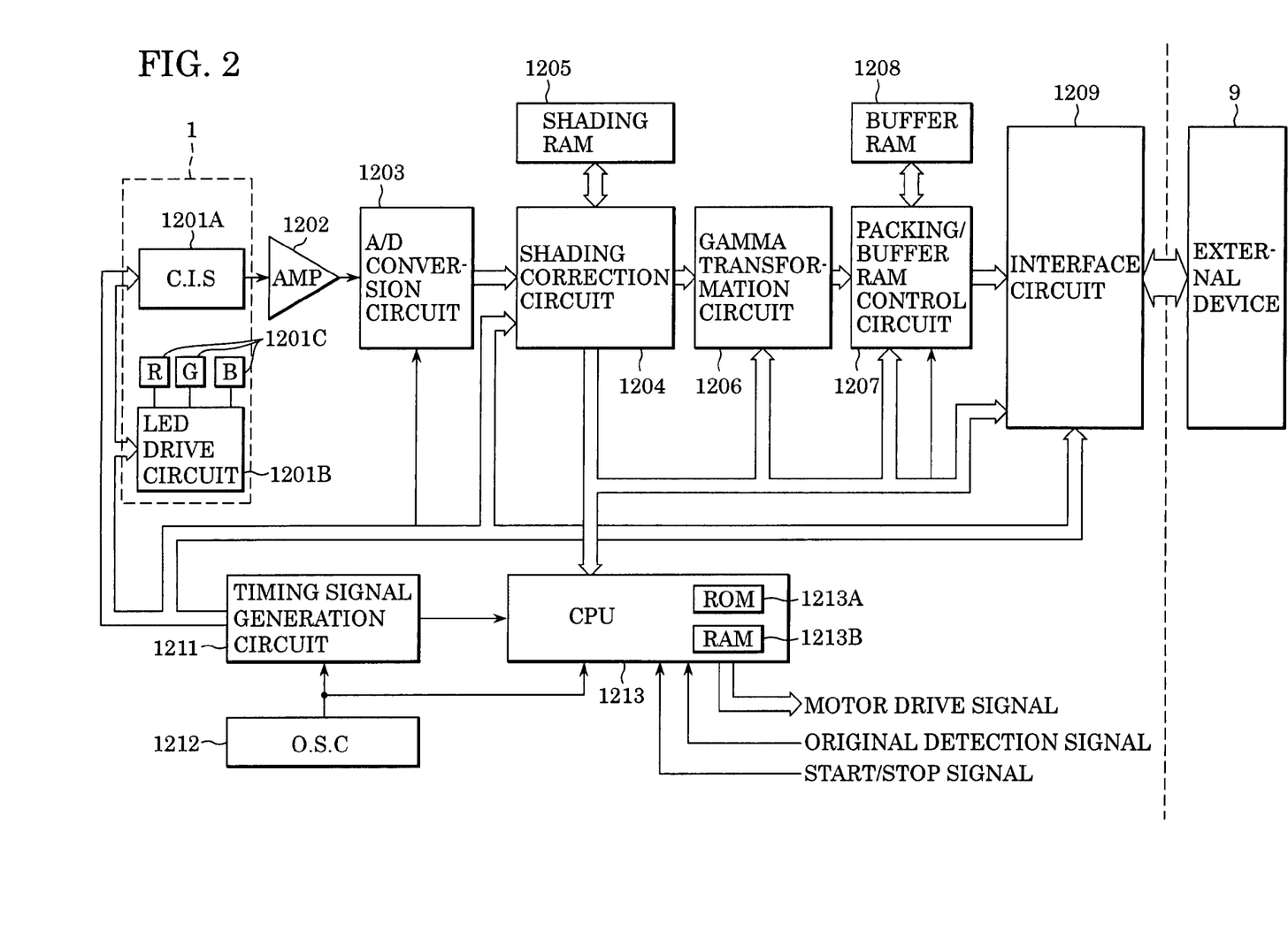
FIG. 2 is a block diagram of the structure of a processing circuit of the image reader of the first embodiment of the present invention.

FIG. 2 is a block diagram of the structure of a processing circuit incorporated in the control base 5. Hereunder, the operation of the circuit will be described with reference to FIG. 2.

In FIG. 2, the reading unit 1 reads an image on a reflection original placed on the original table glass 4 (shown in FIG. 1) or an image on the photographic film 6 accommodated in the film guide 102 (shown in FIG. 1). Light-emitting diodes (LEDs) 1201C are light sources for illuminating the reflection original and are integrally formed in the reading unit 1. A color image having successively disposed red (R), green (G), and blue (B) lines can be read by switching to and turning on an LED of a particular color for each line by an LED control circuit 1201B.

The LEDs 1201C can be LEDs which emit white light. R, G, and B (or cyan (C), magenta (M), and yellow (Y)) optical color filters may be disposed in the light paths of the LEDs from the LEDs 1201C to an original in order to read a color image having these colors successively disposed by the same method as that described above.

Reference numeral 1202 denotes an amplifier for amplifying a signal output from a CIS 1201A. Reference numeral 1203 denotes an analog-to-digital (A/D) converter for performing an A/D conversion on the amplified output in order to produce a digital output of, for example, eight bits. A shading RAM 1205 stores shading correction data by previously reading a white shading plate. A shading correction circuit 1204 performs shading correction on a read image signal on the basis of the data from the shading RAM 1205.

A gamma transformation circuit 1206 performs gamma transformation on the read image data in accordance with a gamma curve previously set by a host computer. A buffer RAM 1208 temporarily stores the image data in order for the actual reading operation and communication with the host computer to be performed at the same timing. A packing/buffer RAM control circuit 1207 performs packing in accordance with an image output mode (binary, four bits, eight bits, or 24 bits) previously set by the host computer and then writes this data on the buffer RAM 1208 in order to read the image data and output it to an interface circuit 1209 from the buffer RAM 1208.

The interface circuit 1209 receives a control signal from or outputs the image signal to the external device 9, such as a personal computer, serving as a host device of the image reader of the embodiment. Reference numeral 1213 denotes a central processing unit (CPU) of, for example, a microcomputer type. The CPU 1213 includes ROM 1213A storing a processing procedure and working RAM 1213B, and controls each part in accordance with the procedure stored in ROM 1213A. Reference numeral 1212 denotes, for example, a crystal oscillator. Reference numeral 1211 denotes a timing signal generation circuit for generating various timing signals serving as references of an operation by dividing an output from the oscillator 1212 in accordance with the setting of the CPU 1213.

Figure 3:
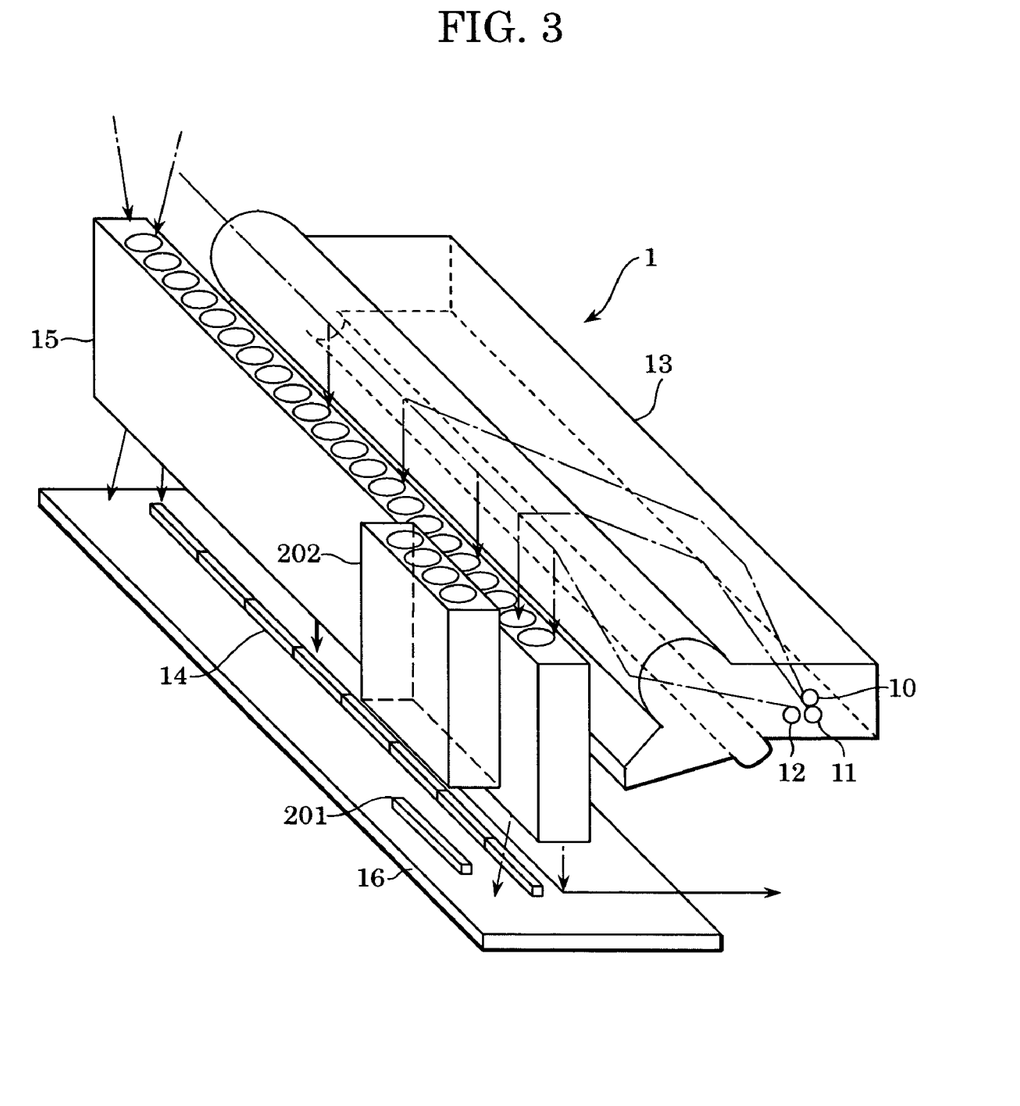
FIG. 3 shows the structure of a reading unit of the image reader of the first embodiment of the present invention.

FIG. 3 shows the structure of the reading unit 1. Reference numeral 10 denotes a red LED, reference numeral 11 denotes a green LED, reference numeral 12 denotes a blue LED, and reference numeral 13 denotes a light guide. Reference numeral 14 denotes a first photoelectric conversion element array, reference numeral 15 denotes a first rod lens array, reference numeral 201 denotes a second photoelectric conversion element array, reference numeral 202 denotes a second rod lens array, and reference numeral 16 denotes a base for mounting the first and second photoelectric conversion element arrays.

The first photoelectric conversion element array 14 and the second photoelectric conversion element array 201 are disposed parallel to each other on the base 16. The first rod lens array 15 is disposed in correspondence with the first photoelectric conversion element array 14, and the second rod lens array 202 is disposed in correspondence with the second photoelectric conversion element array 201.

Figure 4A:
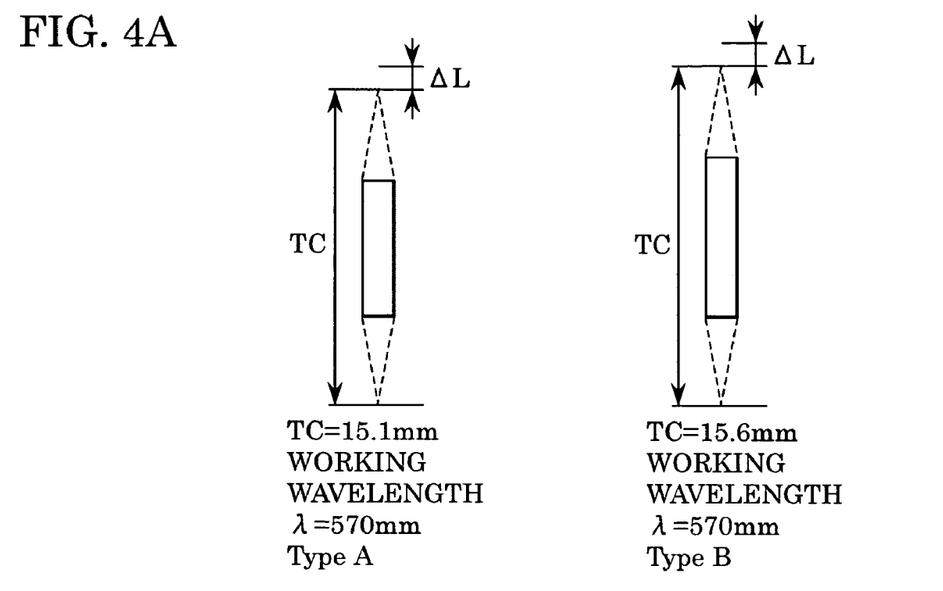
FIGS. 4A to 4C show characteristics of rod lens systems of the reading unit in the first embodiment of the present invention.
Figure 4B:
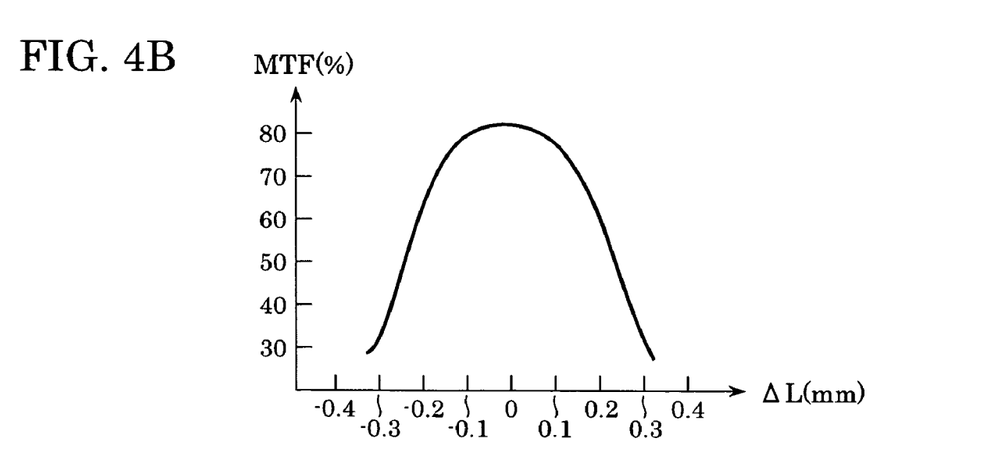
Figure 4C:
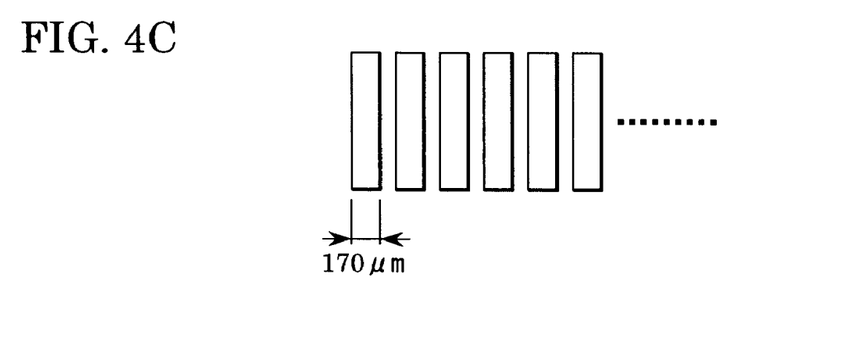

FIGS. 4A to 4C illustrate depths of field of the first rod lens array 15 and the second rod lens array 202.

In FIG. 4A, Type A indicates a rod lens used in the first rod lens array 15, Type B indicates a rod lens used in the second rod lens array 202, and TC denotes the distance between focal positions (conjugation length) when each of the Types A and B is viewed from the side. In this example, the conjugation length TC of the Type A is about 15.1 mm, and the conjugation length TC of the Type B is about 15.6 mm. The graph of FIG. 4B shows changes in spatial frequency MTF at distances separated by ΔL from the focal position of the Type A. The changes in spatial frequency of the Type B are slightly gentler than those of the Type A, but the Type B has substantially the same characteristics as the Type A.

Here, MTF is calculated by the following Formula (1):

$$MTF = (\text{minimum white density} - \text{maximum black density})/(\text{reference white density} - \text{reference black density}) \quad (1)$$

In this embodiment, MTF is calculated from an image on an original that is read at the distances separated by ΔL. The original has white and black lines formed every 170 μm (shown in FIG. 4C). In addition, MTF is calculated on the basis of the minimum white density and the maximum black density of the read image data, and the densities of the original serving as the reference white density and the reference black density.

MTF is an index of resolution. When ΔL increases, an image becomes blurred, thereby reducing MTF. In the case in which MTF is measured at the original having the lines formed every 170 μm as in the embodiment, if MTF is equal to or greater than 40%, it is within a practical range. As can be seen from the graph of FIG. 4B, MTF is at a peak value when ΔL=0 mm. At approximately 0.25 mm from the approximately 82% point, the MTF value becomes approximately equal to or less than 40%.

Next, a general description of the operation of the image reader will be given.

In FIG. 1, the stepping motor 2 is driven by the control base 5. The drive power is transmitted to the holder 101, that is, the reading unit 1 by the belt 3. This causes the reading unit 1 to scan a reflection original placed on the original table glass 4 or the transmission original (photographic film) 6 accommodated in the film guide (film holder) 102 while the reading unit 1 continuously moves along the original table glass 4.

Here, the photoelectric conversion element arrays and the rod lens arrays will be described. As shown in FIG. 3, the first photoelectric conversion element array 14 and the second photoelectric conversion element array 201, mounted to the reading unit 1, are disposed so as to extend in the long axis direction of the reading unit 1.

In this embodiment, the first photoelectric conversion element array 14 is provided to read an A4-size reflection original. Therefore, in order to make it possible to read an image at a density (resolution) of 600 DPI in the short axis direction (210 mm) of the A4-size original, eight photoelectric conversion cells having 645 elements are linearly disposed, so that photoelectric conversion elements for 5160 pixels are arranged on the base 16 in all. Therefore, the first photoelectric conversion element array provides a reading image length (reading width) of approximately 219 mm, and, therefore, is suitable for use in reading an image by moving the reading unit 1 parallel to the short-axis direction of the A4-size original.

The first rod lens array 15 corresponding to the first photoelectric conversion element array 14 is disposed so that its effective focusing range (focusing width) is approximately 219 mm, which is the same as the reading image length (reading width) of the first photoelectric conversion element array 14.

In contrast, the second photoelectric conversion element array 201 is provided to read a transmission original, such as the 35-mm photographic film 6, at a high resolution and at a high speed. Therefore, in order to make it possible to read an image at a density (resolution) of 2400 DPI, one photoelectric conversion cell having 2576 elements is disposed. Therefore, the second photoelectric conversion element array 201 provides a reading image length (reading width) of approximately 27 mm. Since the size of the 35-mm photographic film is approximately 24 mm in its short-axis direction, the second photoelectric conversion element array 201 is suitable for use in reading an image by moving the reading unit 1 parallel to the short-axis direction of the 35-mm photographic film. Since the image reading length is short, compared to the case in which the reading image length for the A4 size original (210 mm) is used at a resolution of 2400 DPI, the image transfer speed per line is increased, and costs are reduced.

The second rod lens array 202 corresponding to the second photoelectric conversion element array 201 is disposed so that its effective focusing range (focusing width) is approximately 27 mm, which is the same as the reading image length (reading width) of the second photoelectric conversion element array 201.

First, the reading of a reflection original will be described.

Figure 5:
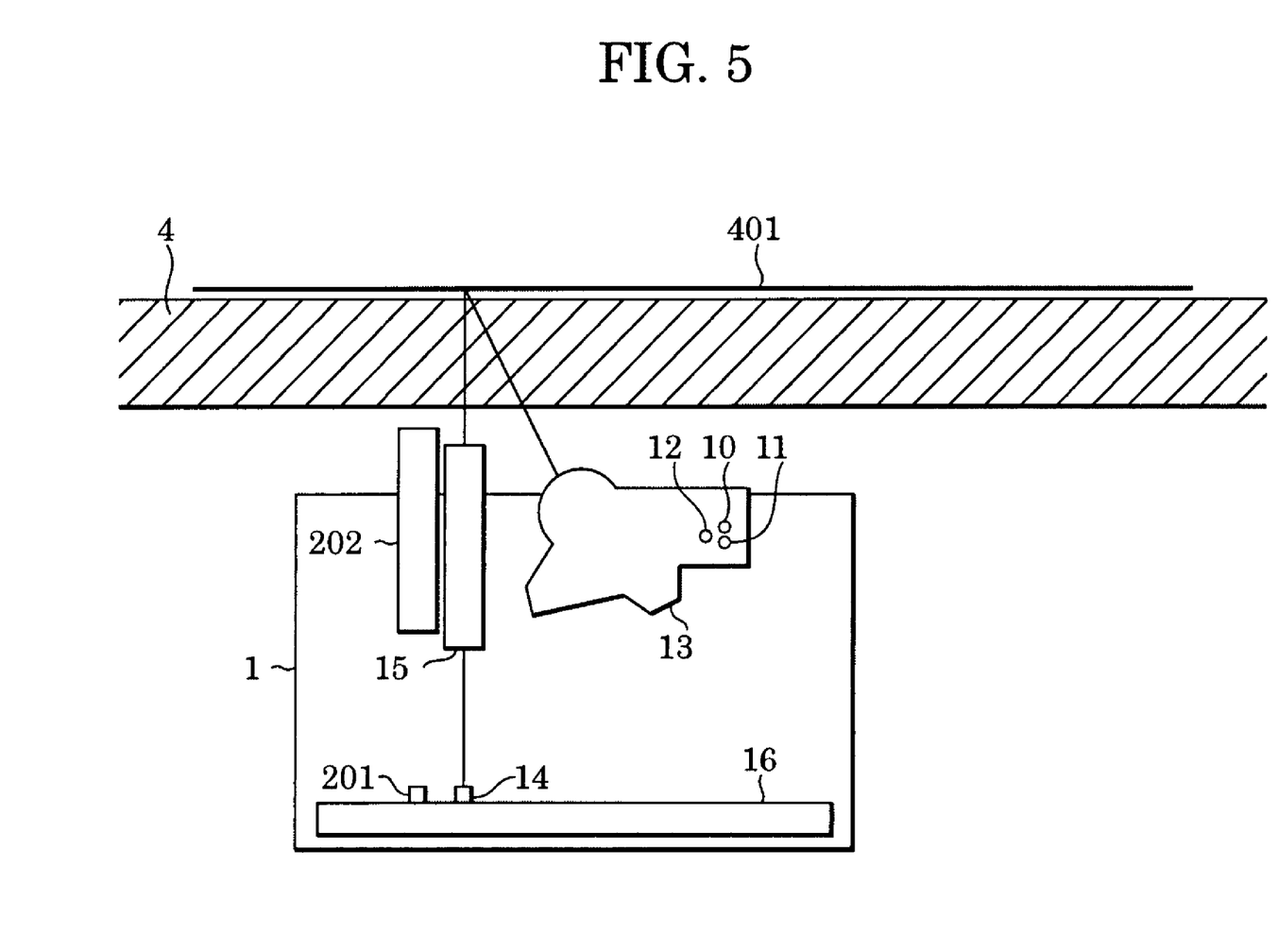
FIG. 5 is a sectional view of the structure of the image reader when a reflection original is read in the first embodiment of the present invention.

FIG. 5 is a sectional view of the image reader when a reflection original 401 is read.

As shown in FIG. 3, light emitted from the red LED 10, the green LED 11, and the blue LED 12 is guided in the long-axis direction (longitudinal direction) of the reading unit 1 by the light guide 13, and is then used to illuminate the top surface of the original table glass 4. The light is reflected by the reflection original 401 placed on the top surface of the original table glass 4, is converged by the first rod lens array 15, and is projected onto the first photoelectric conversion element array 14. As discussed above using FIG. 4, the conjugation length (TC) of the first rod lens array 15 is about 15.1 mm. The first rod lens array 15 is disposed so as to allow the light to be optimally focused at a location that is 0 mm from the top surface of the original table glass 4 (first focal position) and at a location on the photoelectric conversion element array 14, and projects an image of the reflection original 401 onto the first photoelectric conversion element array 14 at 1× magnification. The first photoelectric conversion element array 14 receives the illumination light emitted from the LEDs 10, 11, and 12 and reflected by the reflection original 401, and accumulates an electric charge. A reading start pulse (Hsync) of the next period causes the electric charge to be stored in a transfer unit in the first photoelectric conversion element array 14. Then, an image reading clock (clock) causes it to be output as an electrical signal for every pixel.

The red LED 10, the green LED 11, and the blue LED 12 are switched ON each time the reading start pulse (Hsync) is generated. The movement of the reading unit 1 causes the LEDs 10, 11, and 12 to be successively turned on. An image signal detected after color separation by the LEDs 10, 11, and 12 is sent to the external computer 9 from the control base 5 via the flat cable 8, and is processed in the external computer 9.

Next, the reading of a 35-mm photographic film serving as a transmission original will be described.

Figure 6:
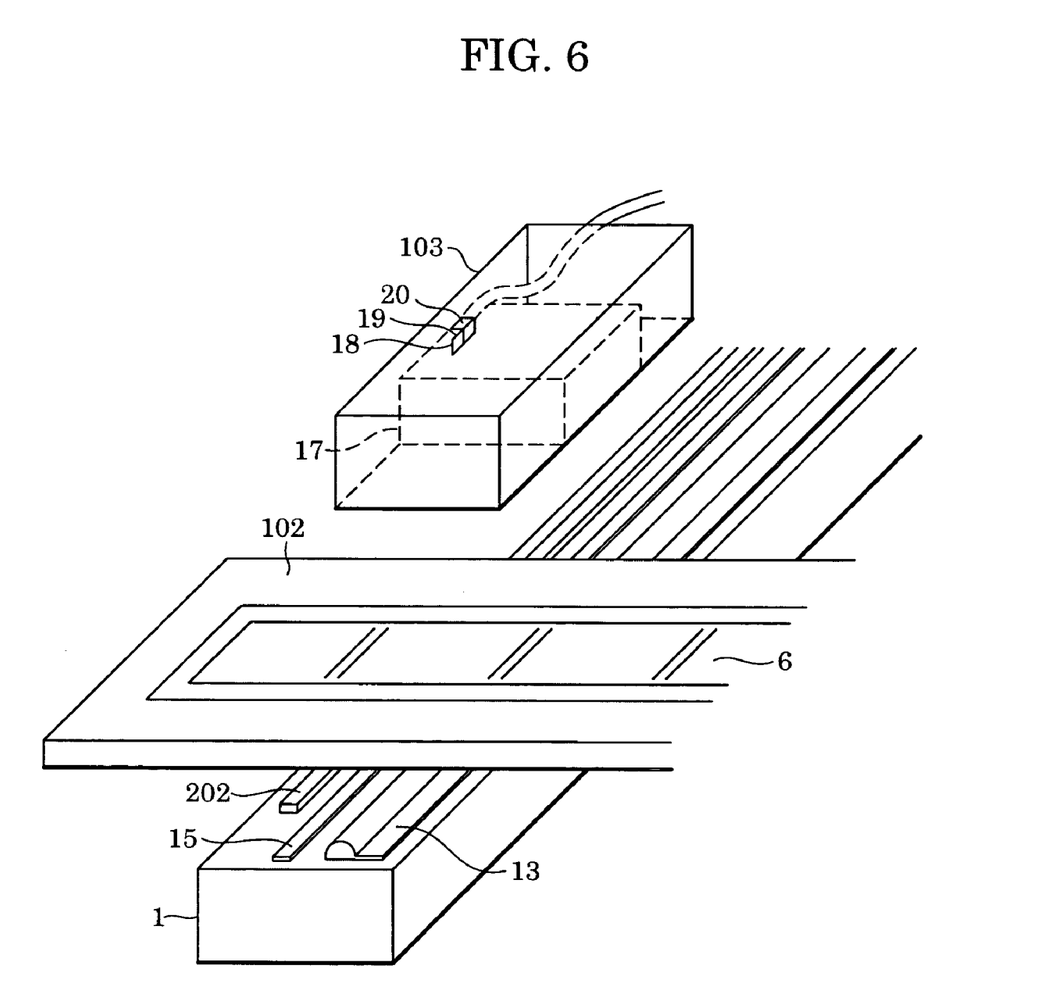
FIG. 6 shows the structure of the image reader when a 35-mm photographic film is read in the first embodiment of the present invention.

FIG. 6 shows the structure of the film light source unit 103 and the film guide (film holder) 102 when the 35-mm photographic film is read.

A diffusing plate 17, a film red LED 18, a film green LED 19, and a film blue LED 20 are disposed in the film light source unit 103. The diffusing plate 17 in the embodiment may be a surface light source disclosed in, for example, Japanese Laid-Open No. 2001-34210 (corresponding U.S. Pat. Nos. 6,502,946 and 6,776,494). Light from each of the LEDs is diffused by the diffusing plate 17 and is emitted as uniform light from the lower surface of the diffusing plate 17 in FIG. 6. The diffusing plate 17 in this embodiment has a size of about 50 mm×25 mm, and can be used to illuminate an effective image area corresponding to one frame of the 35-mm photographic film 6, that is, approximately 36 mm×24 mm.

The 35-mm photographic film 6 is accommodated in the film guide 102. The film guide 102 is disposed above the original table glass 4 (not shown in FIG. 6). Here, the 35-mm photographic film 6 is disposed so as to fit in an effective reading range of the second photoelectric conversion element array 201 in the reading unit 1.

Figure 7:
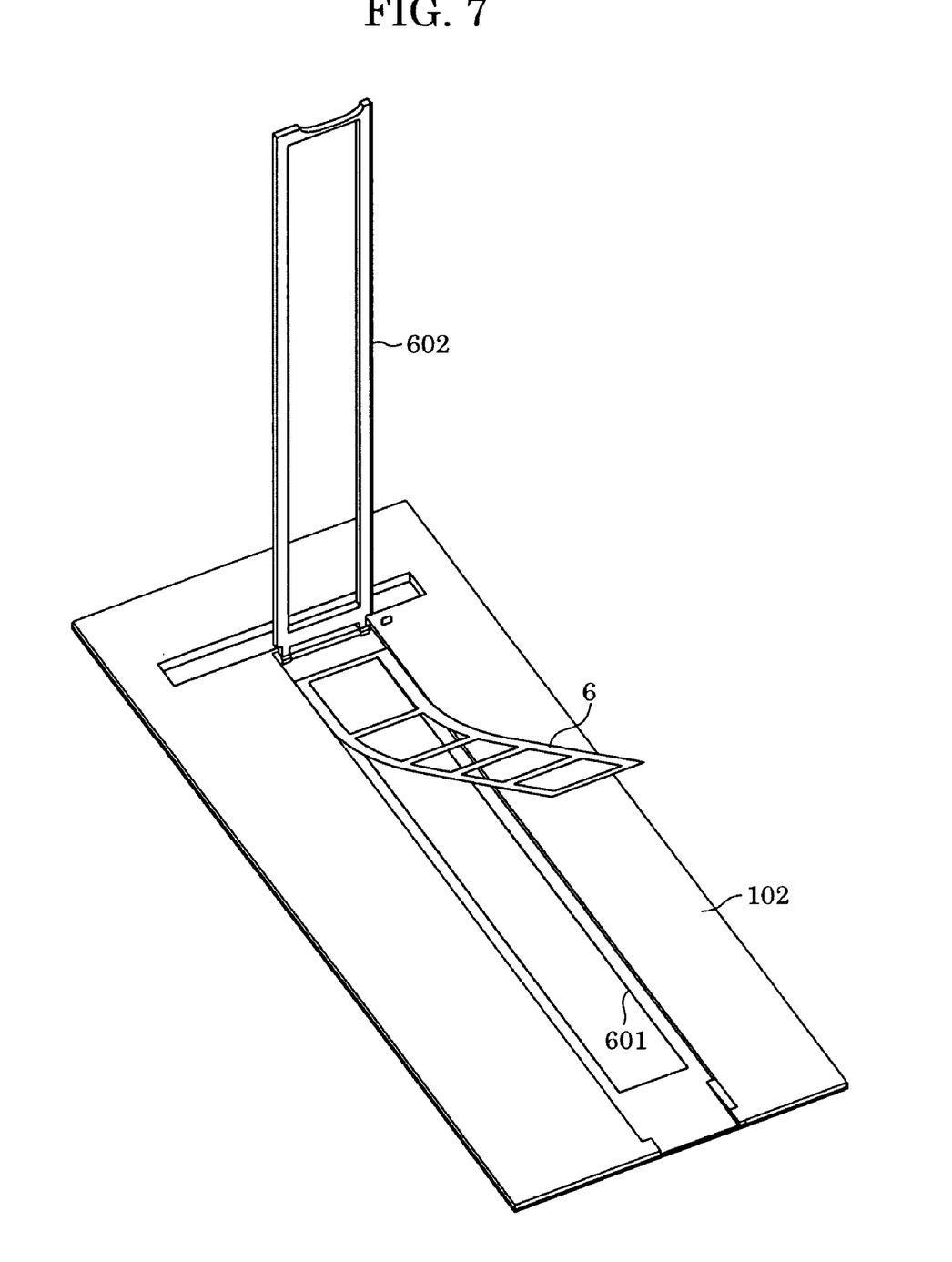
FIG. 7 shows a method for mounting the 35-mm photographic film to a film guide in the first embodiment of the present invention.

FIG. 7 shows the structure of the film guide 102. As shown in FIG. 7, the 35-mm photographic film 6 is set in a window frame 601, and is secured thereto by a film holder 602. The thickness of the window frame 601 is approximately 0.5 mm. Therefore, the 35-mm photographic film 6 is set at a second focal position, which is approximately 0.5 mm above the first focal position at the original table glass 4 when the 35-mm photographic film 6 is set above the original table glass 4.

Figure 8:
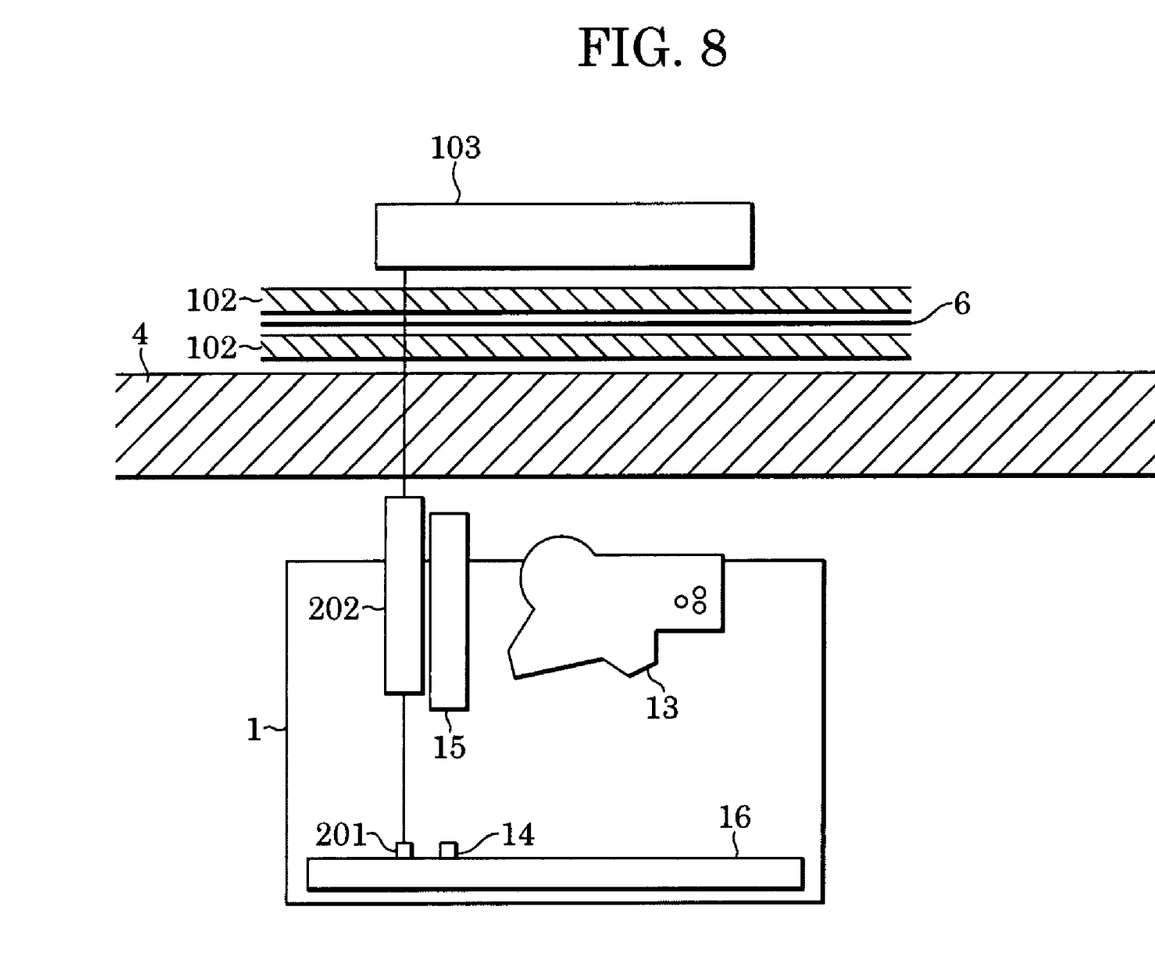
FIG. 8 is a sectional view of the structure of the image reader when the 35-mm photographic film is read in the first embodiment of the present invention.

FIG. 8 is a sectional view of the image reader when the 35-mm photographic film 6 is read.

Illumination light from the film red LED 18, the film green LED 19, and the film blue LED 20 of the film light source unit 103 passes through the 35-mm photographic film 6 at the second focal position, is converged by the second rod lens array 202, and is projected onto the second photoelectric conversion element array 201. As discussed above using FIG. 4, the conjugation length (TC) of the second rod lens array 202 is about 15.6 mm. The second rod lens array 202 is disposed so as to allow the light to be optimally focused at the second focal position that is about 0.5 mm from the top surface of the original table glass 4 and at a location on the photoelectric conversion element array 201, and projects an image on the 35-mm photographic film 6 onto the second photoelectric conversion element array 201 at 1× magnification.

The second photoelectric conversion element array 201 receives the light emitted from the LEDs 18, 19, and 20 and transmitted through the 35-mm photographic film 6, and accumulates an electric charge. Subsequent operations are the same as those carried out when reading the reflection original. A signal output from the first photoelectric conversion element array used when reading the reflection original and a signal output from the second photoelectric conversion element array 201 used when reading the transmission original are processed by the same processing circuit shown in FIG. 2.

Although the 35-mm photographic film 6 is disposed approximately 0.5 mm above the original table glass 4, the focal position can be adjusted with the second rod lens array 202. Therefore, it is possible to read an image at proper resolution.

As described above, in the embodiment, an image reading element array having a resolution and a reading image length suitable for a reflection original and a rod lens array having a focal length suitable for the reflection original are used when reading the reflection original, and an image reading element array having a resolution and a reading image length suitable for a transmission original and a rod lens array having a focal length suitable for the transmission original are used when reading the transmission original. This makes it possible to read an image on the reflection original and an image on the transmission original under optimal conditions with one image reading unit and an image reader using the image reading unit.

In reading a transmission original requiring a higher resolution than in reading a reflection original, it is possible to reduce the length of an expensive reading element providing a high resolution to the minimum required. Therefore, compared to the case in which one long and high resolution reading element is used for a reflection original and a transmission original, it is possible to reduce costs and increase reading speed.

Second Embodiment

Figure 9:
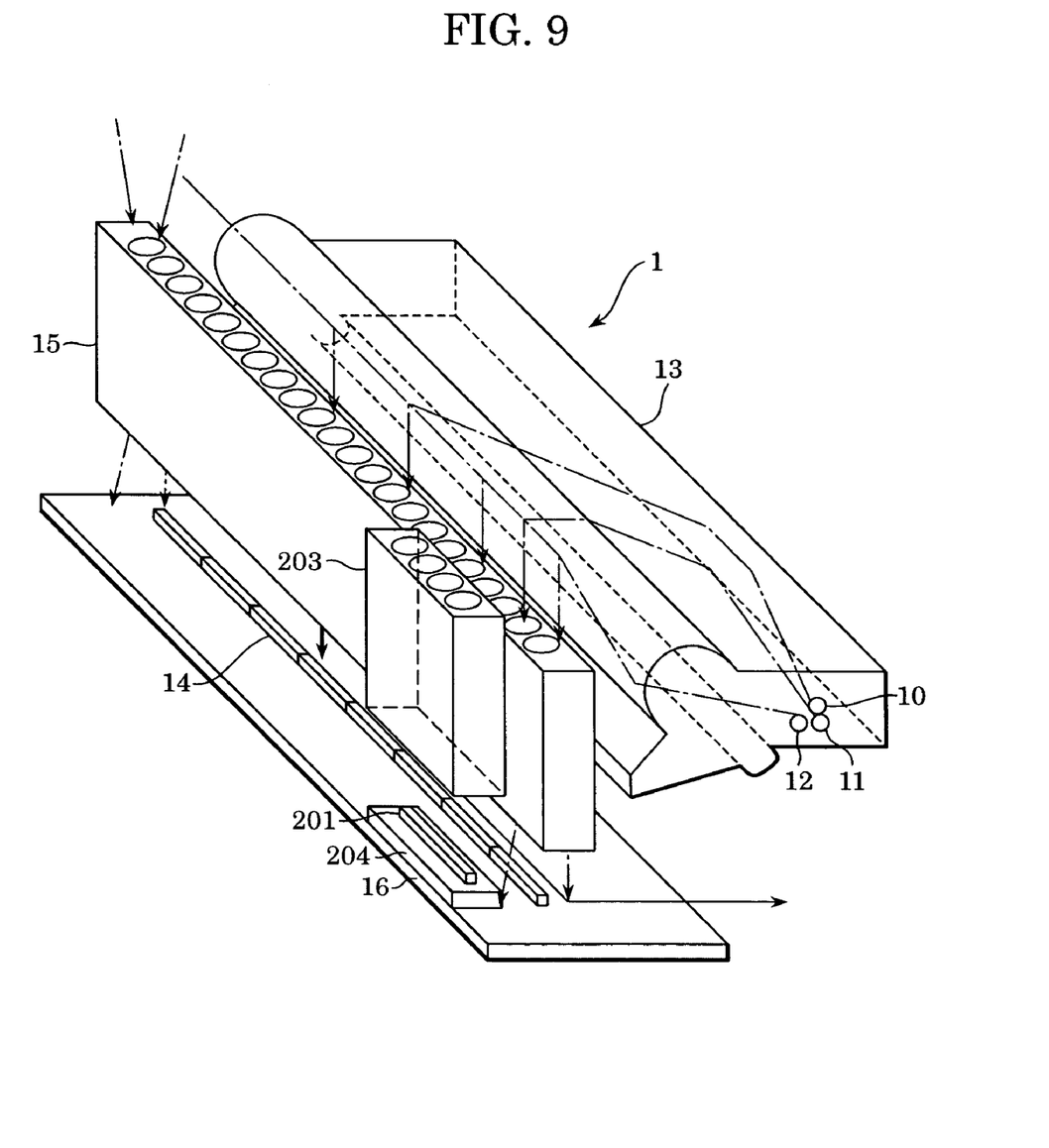
FIG. 9 shows the structure of a reading unit of an image reader of a second embodiment of the present invention.

FIG. 9 shows the structure of a reading unit 1 of a second embodiment. The reading unit of the second embodiment has basically the same structure as that of the first embodiment shown in FIG. 5. The differences are that a rod lens array having the same conjugation length as a first rod lens array 15 is used as a second rod lens array 203, and that, due to this, a second photoelectric conversion element array 201 is mounted to an adjusting member 204 having a thickness on the order of about 0.5 mm and disposed on a base 16 instead of directly mounting the second photoelectric conversion element array 201 onto the base 16 to which a first photoelectric conversion element array 14 is mounted. The other structural features are the same as those in FIG. 5.

Figure 10:
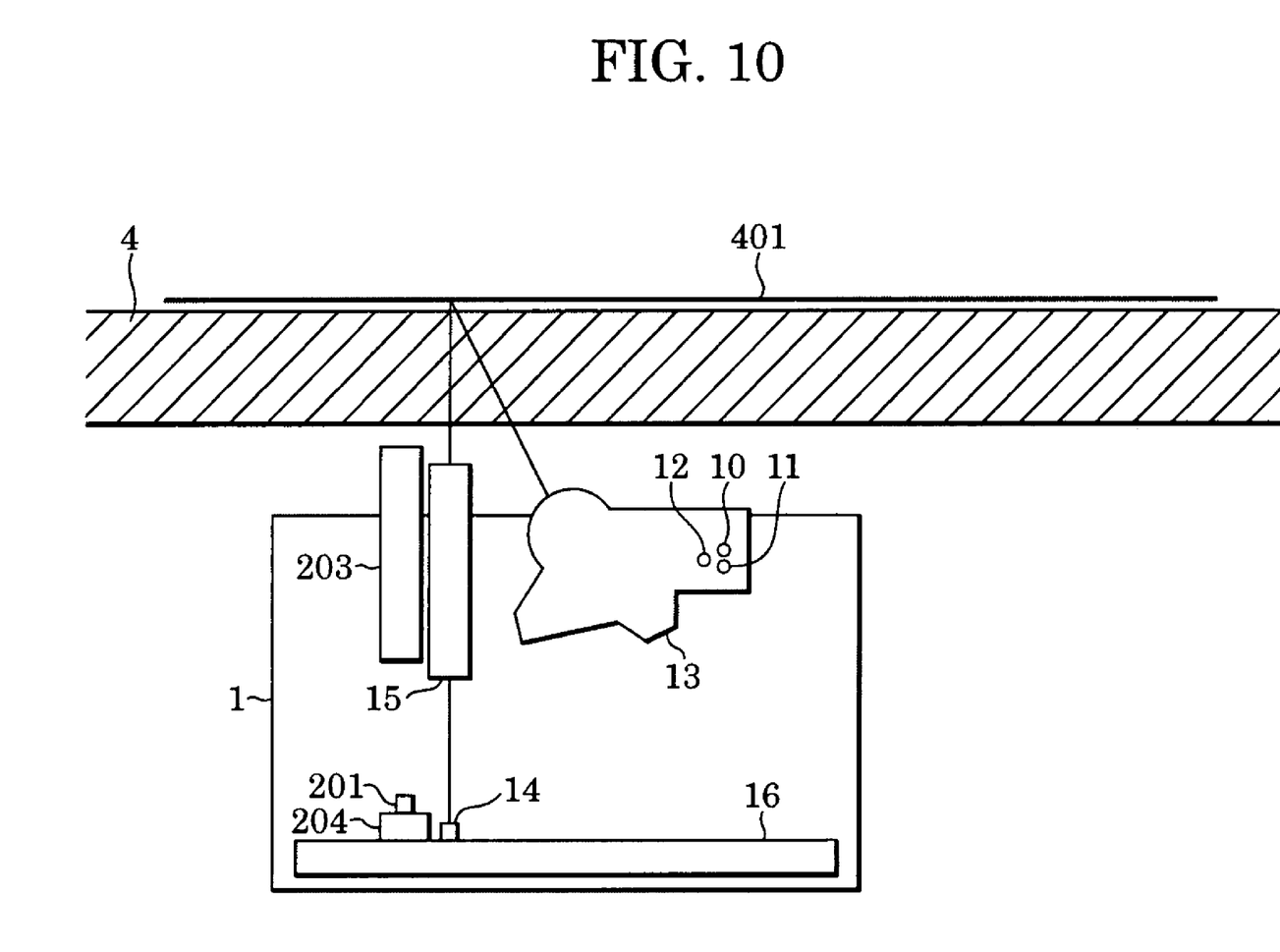
FIG. 10 is a sectional view of the structure of the image reader when a reflection original is read in the second embodiment of the present invention.

FIG. 10 is a sectional view of an image reader when a reflection original 401 is read.

As shown in FIG. 10, light emitted from a red LED 10, a green LED 11, and a blue LED 12 is guided in the long-axis direction (longitudinal direction) of the reading unit 1 by a light guide 13, and then is used to illuminate the top surface of an original table glass 4. The light is reflected by the reflection original 401 placed on the top surface of the original table glass 4, is converged by the first rod lens array 15, and is projected onto the first photoelectric conversion element array 14. A conjugation length (TC) of the first rod lens array 15 is about 15.1 mm. The first rod lens array 15 is disposed so as to allow the light to be optimally focused at a location that is 0 mm from the top surface of the original table glass 4 (first focal position) and at a location on the photoelectric conversion element array 14, and projects an image on the reflection original 401 onto the first photoelectric conversion element array 14 at 1× magnification.

Subsequent operations are the same as those of the above-described first embodiment.

Figure 11:
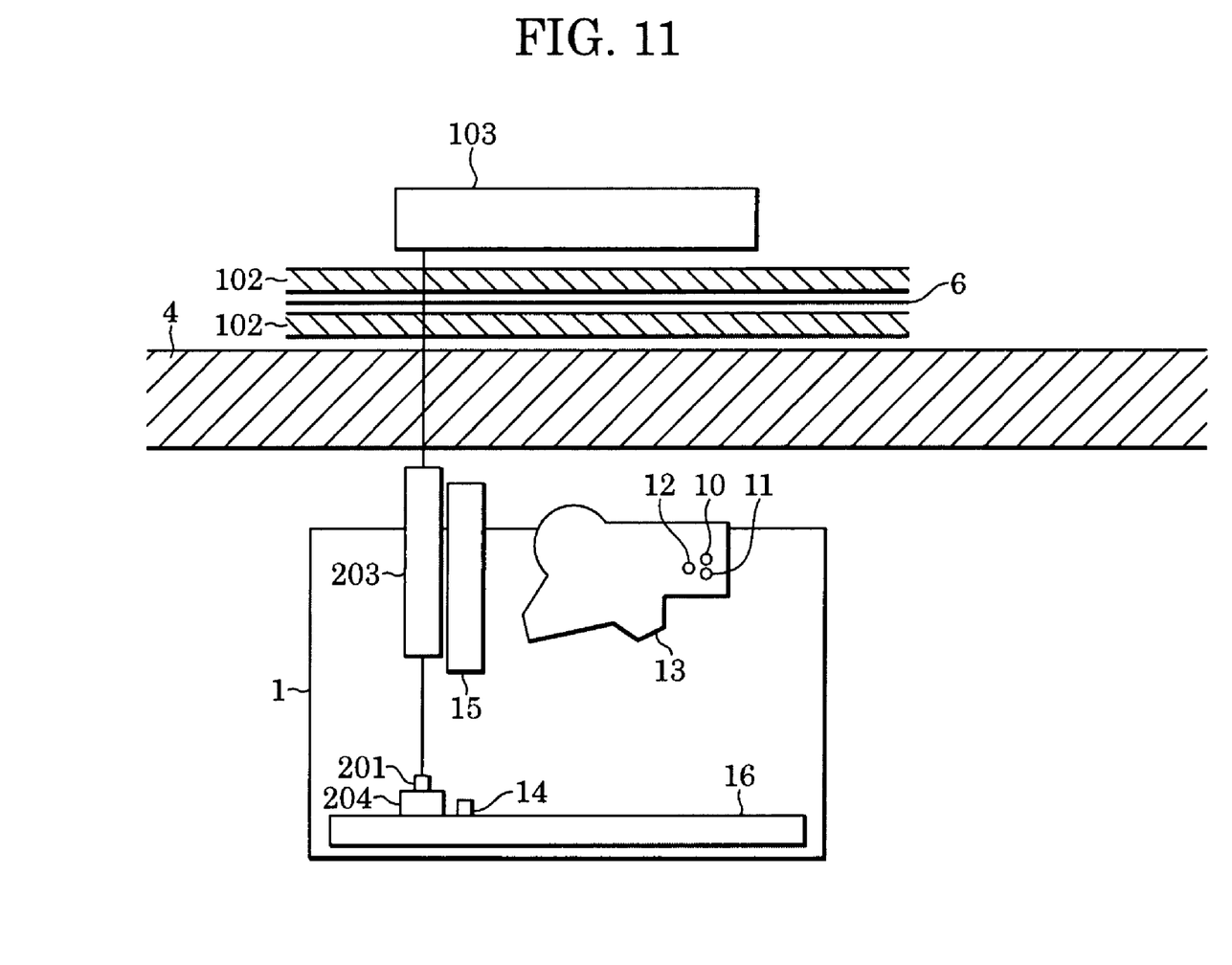
FIG. 11 is a sectional view of the structure of the image reader when a 35-mm photographic film is read in the second embodiment of the present invention.

FIG. 11 is a sectional view of the image reader when a 35-mm photographic film 6 is read.

Illumination light from a film red LED 18, a film green LED 19, and a film blue LED 20 of a film light source unit 103 passes through the 35-mm photographic film 6 at a second focal position, is converged by the second rod lens array 203, and is projected onto the second photoelectric conversion element array 201. A conjugation length (TC) of the second rod lens array 203 is about 15.1 mm, which is the same as that of the first rod lens array 15. The second rod lens array 203 is disposed about 0.5 mm from the first rod lens array 15 so as to allow the light to be optimally focused at the second focal position, that is, about 0.5 mm from the top surface of the original table glass 4, and on the photoelectric conversion element array 201, and projects an image on the 35-mm photographic film 6 onto the second photoelectric conversion element array 201 at 1× magnification. The second photoelectric conversion element array 201 receives the light emitted from the LEDs 18, 19, and 20 and transmitted through the 35-mm photographic film 6, and accumulates an electric charge. Subsequent operations are the same as those carried out when reading the reflection original.

An image on the 35-mm photographic film 6 disposed approximately 0.5 mm from the original table glass 4 can be read at the proper resolution by using the second rod lens array 203.

As described above, it is possible to read an image under optimal conditions corresponding to an original.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2002-291157 filed Oct. 3, 2002, which is hereby incorporated by reference herein.

What is claimed is:

1. An image reader operable to read images including first and second original images, comprising:
an image reading unit comprising:
a first image reading element array including a plurality of photoelectric conversion elements which are linearly disposed;
a second image reading element array including a plurality of photoelectric conversion elements which are linearly disposed, the second image reading element array being disposed parallel to the first image reading element array;
a base supporting the first and second image reading element arrays disposed on a same plane thereon;
a first rod lens member configured to focus the first original image, disposed at a first focal position, onto the first image reading element array; and
a second rod lens member configured to focus the second original image, disposed at a second focal position, onto the second image reading element array,
wherein the second rod lens member has a conjugation length different from a conjugation length of the first rod lens member;
a movable unit moving the image reading unit relative to at least one of the first original image and the second original image; and
a holder and an original table adapted to support originals including first and second originals,
wherein the original table directly supports the first original thereon, and
wherein the holder accommodates the second original at a predetermined location above the original table, a distance between the predetermined location and the original table corresponding to a difference between the conjugation length of the first rod lens member and the conjugation length of the second rod lens member.

2. The image reader according to claim 1, further comprising a first illuminating unit illuminating the first original image, and a second illuminating unit illuminating the second original image.

3. The image reader according to claim 1, wherein a conjugation length of the second rod lens member is longer than a conjugation length of the first rod lens member.

4. The image reader according to claim 1, wherein a resolution of the second image reading element array is higher than a resolution of the first image reading element array.

5. The image reader according to claim 1, wherein an effective reading width of the second image reading element array is less than an effective reading width of the first image reading element array.

6. The image reader according to claim 1, wherein an effective focusing range of the second rod lens member is smaller than an effective focusing range of the first rod lens member.

7. The image reader according to claim 1, wherein each of the first and second rod lens members includes a rod lens array.

8. The image reader according to claim 1, wherein the first original image is a reflection original image, and the second original image is a transmission original image.

* * * * *